(12) United States Patent
Sangalli et al.

(10) Patent No.: US 11,572,515 B2
(45) Date of Patent: Feb. 7, 2023

(54) PROCESS FOR HYDROCRACKING A HYDROCARBON FEED STREAM

(71) Applicant: UOP LLC, Des Plaines, IL (US)

(72) Inventors: Massimo Sangalli, Des Plaines, IL (US); John A. Petri, Wauconda, IL (US); Magaly Estremera, Port Saint Lucie, FL (US); Yoga R Ayar, Buffalo Grove, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 17/139,455

(22) Filed: Dec. 31, 2020

(65) Prior Publication Data

US 2022/0204877 A1 Jun. 30, 2022

(51) Int. Cl.
*C10G 67/00* (2006.01)
*C10G 67/14* (2006.01)
(Continued)

(52) U.S. Cl.
CPC ............... *C10G 67/14* (2013.01); *B01D 3/06* (2013.01); *B01D 3/143* (2013.01); *C10G 65/10* (2013.01);
(Continued)

(58) Field of Classification Search
CPC ........ C10G 47/00; C10G 47/02; C10G 47/36; C10G 65/02; C10G 65/10; C10G 65/12;
(Continued)

(56) References Cited

U.S. PATENT DOCUMENTS 3,702,818 A * 11/1972 Streed et al. .......... C10G 47/12
  208/89
2003/0221990 A1* 12/2003 Yoon ...................... C10G 65/12
  208/59
(Continued)

FOREIGN PATENT DOCUMENTS

CN 101747936 B 6/2010
EP 1319701 A1 6/2003

OTHER PUBLICATIONS

Sadighi, "Modeling and Optimizing a Vacuum Gas Oil Hydrocracking Plant using an Artificial Neural Network", "International Journal of Technology", Jan. 27, 2018, pp. 99-109, vol. 9, No. 1, Publisher: Faculty of Engineering, Universitas Indonesia.

*Primary Examiner* — Prem C Singh
*Assistant Examiner* — Brandi M Doyle
(74) *Attorney, Agent, or Firm* — Paschall & Associates LLC; James C. Paschall (57) ABSTRACT

A hydrocracking process is disclosed. The hydrocracking process comprises hydrocracking a hydrocarbon feed stream in a hydrocracking reactor in the presence of a hydrogen stream and a hydrocracking catalyst to produce a hydrocracked effluent stream. The hydrocracked effluent stream is separated in a separator to provide a vapor hydrocracked stream and a liquid hydrocracked stream. The liquid hydrocracked stream is fractionated to provide a naphtha stream, a kerosene stream having a T90 temperature of about 204° C. (399° F.) to about 238° C. (460° F.), a diesel stream having a T90 temperature of about 360° C. (680° F.) to about 383° C. (721° F.) and an unconverted oil stream. The kerosene stream, the unconverted oil stream, and a portion of the diesel stream is recycled to the hydrocracking reactor for hydrocracking.

20 Claims, 2 Drawing Sheets

(51) Int. Cl.
*C10G 65/10* (2006.01)
*B01D 3/06* (2006.01)
*B01D 3/14* (2006.01)

(52) U.S. Cl.
CPC ... *C10G 2300/301* (2013.01); *C10G 2400/04* (2013.01); *C10G 2400/08* (2013.01)

(58) Field of Classification Search
CPC .......... C10G 2300/301; C10G 2400/04; C10G 2400/06; C10G 2400/08
See application file for complete search history.

(56) References Cited

U.S. PATENT DOCUMENTS

| | | | |
|---|---|---|---|
| 2009/0159493 A1 | 6/2009 | Bhattacharya | |
| 2014/0353211 A1* | 12/2014 | Digne | C10G 67/02 208/97 |
| 2016/0369183 A1* | 12/2016 | Hoehn | C10G 65/10 |
| 2018/0119023 A1* | 5/2018 | Eizenga | B01D 3/141 |

* cited by examiner

PROCESS FOR HYDROCRACKING A HYDROCARBON FEED STREAM

FIELD

The field relates to a hydrocracking process for hydrocracking a hydrocarbon feed stream. Particularly, the field relates to a hydrocracking process for hydrocracking a hydrocarbon feed stream and a recycle stream.

BACKGROUND

Hydroprocessing can include processes which convert hydrocarbons in the presence of hydroprocessing catalyst and hydrogen to more valuable products. Hydrocracking is a hydroprocessing process in which hydrocarbons crack in the presence of hydrogen and hydrocracking catalyst to lower molecular weight hydrocarbons. Depending on the desired output, a hydrocracking unit may contain one or more fixed beds of the same or different catalyst. Typically, hydrocracking process is employed to crack hydrocarbon feeds such as vacuum gas oil (VGO) to diesel including kerosene and gasoline motor fuels. Hydrocracking can be achieved in one or more stages. Usually, in a hydrocracking process, a hydrocracked effluent is fractionated which produces various fractions including an unconverted oil. A portion of the unconverted oil is recycled back to the reactors with hydrocracking catalyst without value addition or recovery.

Naphtha is primarily used as a petrochemical feedstock for aromatic complexes and naphtha crackers and producing more valuable petrochemical products. When operating at high naphtha yield refiners face problems such as reduction in the diesel yield. In a hydrocracking unit, the heavy naphtha product yields can be maximized at a higher severity i.e. lower recycle cut point. As the recycle cut point is lowered, there is a reduction in the diesel yields. The diesel produced in such conditions for typical feeds is a very light product and is similar to kerosene. Therefore, refiners face a loss in terms of lower diesel yield or a lower specific gravity and lower boiling diesel product.

Accordingly, it is desirable to provide new hydrocracking apparatuses and processes for providing diesel product meeting the fuel specification while producing requisite naphtha for producing more valuable petrochemical products. Also, there is a need for an alternative approach to maximize yield of naphtha from such processes. Other desirable features and characteristics of the present subject matter will become apparent from the subsequent detailed description of the subject matter and the appended claims, taken in conjunction with the accompanying drawings and this background of the subject matter.

BRIEF SUMMARY

Various embodiments contemplated herein relate to hydrocracking process processes and apparatuses The exemplary embodiments taught herein provide hydrocracking process for hydrocracking a hydrocarbon feed stream.

In accordance with an exemplary embodiment, hydrocracking process is provided. The hydrocracking process may comprise hydrocracking a hydrocarbon feed stream in a hydrocracking reactor in the presence of a hydrogen stream and a hydrocracking catalyst to produce a hydrocracked effluent stream. The hydrocracked effluent stream may be separated in a separator to provide a vapor hydrocracked stream and a liquid hydrocracked stream. The liquid hydrocracked stream may be fractionated to provide a naphtha stream, a kerosene stream, a diesel stream, and an unconverted oil stream. The kerosene stream may have a T90 temperature of about 204° C. (399° F.) to about 238° C. (460° F.). The diesel stream may have a T90 temperature of about 360° C. (680° F.) to about 383° C. (721° F.). The unconverted oil stream may have a T10 temperature of about 345° C. (653° F.) to about 395° C. (743° F.). The kerosene stream, the unconverted oil stream, and a portion of the diesel stream is recycled to the hydrocracking reactor. The diesel stream recycled to the hydrocracking reactor may range from about 5 wt % to about 30 wt % of the hydrocarbon feed stream. The kerosene stream recycled to the hydrocracking reactor may range from about 5 to about 30 wt % of the feed stream. The process further comprises withdrawing a remaining portion of the diesel stream as a diesel product stream in an amount from about 5 wt % to about 40 wt % of the hydrocarbon feed stream.

The process of the present disclosure envisages providing an improved process for hydrocracking a hydrocarbon feed stream. Usually, operating under high naphtha yield may result in reduction in the diesel yield. The heavy naphtha product yields can be maximized at a higher severity i.e. lower recycle cut point. As the recycle cut point is lowered, there is a reduction in the diesel yields. The diesel produced in such conditions for typical feeds is a lower specific gravity and lower boiling range product and is similar to kerosene. Applicants provide a process that addresses the problem of reduction in the diesel yields, increases the specific gravity and boiling range of the diesel product. The current process envisages fractionating the recycle oil into three cuts, a light cut stream, a medium cut stream, and a heavy cut. A portion of the medium cut stream can be withdrawn as a diesel product stream that meets given fuel specification. The other streams are recycled to the hydrocracking reactor to maintain naphtha yield.

These and other features, aspects, and advantages of the present disclosure will become better understood upon consideration of the following detailed description, drawings and appended claims.

BRIEF DESCRIPTION OF THE DRAWING

The various embodiments will hereinafter be described in conjunction with the following FIGURES, wherein like numerals denote like elements.

DEFINITIONS

As used herein, the term "column" means a distillation column or columns for separating one or more components of different volatilities. Unless otherwise indicated, each column includes a condenser on an overhead of the column to condense the overhead vapor and reflux a portion of an overhead stream back to the top of the column. Also included is a reboiler at a bottom of the column to vaporize and send a portion of a bottom stream back to the bottom of the column to supply fractionation energy. Feeds to the columns may be preheated. The top pressure is the pressure of the overhead vapor at the outlet of the column. The bottom temperature is the liquid bottom outlet temperature.

Overhead lines and bottom lines refer to the net lines from the column downstream of the reflux or reboil to the column. Alternatively, a stripping stream may be used for heat input at the bottom of the column.

As used herein, the term "passing" includes "feeding" and "charging" and means that the material passes from a conduit or vessel to an object.

As used herein, the term "portion" means an amount or part taken or separated from a main stream without any change in the composition as compared to the main stream. Further, it also includes splitting the taken or separated portion into multiple portions where each portion retains the same composition as compared to the main stream.

As used herein, the term "unit" can refer to an area including one or more equipment items and/or one or more sub-units. Equipment items can include one or more reactors or reactor vessels, heaters, separators, drums, exchangers, pipes, pumps, compressors, and controllers. Additionally, an equipment item, such as a reactor, dryer, or vessel, can further include one or more units or sub-units.

The term "communication" means that material flow is operatively permitted between enumerated components.

The term "downstream communication" means that at least a portion of material flowing to the subject in downstream communication may operatively flow from the object with which it communicates.

The term "$C_x$" wherein "x" is an integer means a hydrocarbon stream with hydrocarbons have x carbon atoms.

As used herein, the term "separator" means a vessel which has an inlet and at least an overhead vapor outlet and a bottoms liquid outlet and may also have an aqueous stream outlet from a boot. A flash drum is a type of separator which may be in downstream communication with a separator. The separator may be operated at higher pressure than the flash drum.

As used herein, the term "stream" can include various hydrocarbon molecules such as straight-chain, branched, or cyclic alkanes, alkenes, alkadienes, and alkynes, and optionally other substances, such as gases, e.g., hydrogen, or impurities, such as heavy metals, and sulfur and nitrogen compounds. The stream can also include aromatic and non-aromatic hydrocarbons. Moreover, the hydrocarbon molecules may be abbreviated C1, C2, C3 . . . Cn where "n" represents the number of carbon atoms in the one or more hydrocarbon molecules. Furthermore, a "+" or "−" may be used with an abbreviated one or more hydrocarbons notation, e.g., C3− or C3+, which is inclusive of the abbreviated one or more hydrocarbons. As an example, the abbreviation "C3+" means one or more hydrocarbon molecules of three carbon atoms and/or more. Also, a stream can include one or more fluids other than or in addition to hydrocarbons. Such as air, nitrogen, and steam.

As used herein, the term "bottoms stream" or "bottoms" can mean a stream withdrawn in a line extending from or near a bottom of a vessel, such as a column.

As used herein, the term "T5", "T10", "T90", or "T95" means the temperature at which 5 volume percent or 10 volume percent or 90 volume percent or 95 volume percent, as the case may be, respectively, of the sample boils using ASTM D 86 or ASTM D 1160.

As used herein, the term "True Boiling Point" (TBP) means a test method for determining the boiling point of a material which corresponds to ASTM D2892 for the production of a liquefied gas, distillate fractions, and residuum of standardized quality on which analytical data can be obtained, and the determination of yields of the above fractions by both mass and volume from which a graph of temperature versus mass % distilled is produced using fifteen theoretical plates in a column with a 5:1 reflux ratio.

As used herein, the term "initial boiling point" (IBP) means the temperature at which the sample begins to boil using ASTM D 86.

As used herein, the term "diesel cut" or "diesel stream" means hydrocarbons boiling in the range of an IBP between about 125° C. (257° F.) and about 175° C. (347° F.) or a T5 between about 204° C. (399° F.) and about 238° C. (460° F.) or a T90 between about 360° C. (680° F.) and 383° C. (721° F.) using the TBP distillation method.

As used herein, the term "predominant" or "predominate" means greater than 50%, suitably greater than 75% and preferably greater than 90%.

DETAILED DESCRIPTION

Applicants disclose a process for producing a diesel product stream that meets a given specification while maximizing the heavy naphtha production. The specification includes one or more of China VI diesel and Euro V diesel. Usually, in a hydrocracking unit, the heavy naphtha product yields can be maximized at a higher severity which means employing a lower recycle cut point. As the recycle cut point is lowered, there is a reduction in the diesel yields. The diesel produced in these conditions for typical feeds is a lighter product with lower specific gravity or lower boiling point and is similar to kerosene. Hence this product does not meet the required specifications in terms of minimum specific gravity and cetane number or index. Applicants provide a new process that meets required diesel specifications and also maximizes the heavy naphtha production. In the applicants' process, the recycle oil is fractionated into three cuts including a light, medium and heavy cut. The medium cut also called a heart cut, meets required diesel specifications. Portions of the heavy cut and the light cut may be recycled back to the reactor section.

Applicants process is unique in terms of the recycle oil being split into three streams, of which the heartcut is produced as diesel stream meeting required specifications. The flow and cutpoints of the heartcut stream can be chosen so that the desired yield of diesel meeting Euro V or China VI diesel specifications can be produced along with the heavy naphtha as the main product. Portions of the other two streams, the lightest stream predominantly comprising kerosene and the heaviest stream predominantly comprising unconverted oil (UCO) are recycled to the reaction section where they are cracked to produce naphtha and lighter hydrocarbons. A portion of the heartcut can also be recycled to the reaction section. Without applicants' process, the desired diesel stream would not meet the required specifications at the high severity needed to produce significant amount of naphtha at the same time. The applicants' process thus provides a performance advantage.

The process and apparatus have been demonstrated in a pilot plant and is a viable option for any hydrocracking unit to produce diesel product meeting the given specifications while maximizing the heavy naphtha production.

The following detailed description is merely exemplary in nature and is not intended to limit the various embodiments or the application and uses thereof. Furthermore, there is no intention to be bound by any theory presented in the preceding background or the following detailed description. The FIGURES have been simplified by the deletion of a large number of apparatuses customarily employed in a process of this nature, such as vessel internals, temperature and pressure controls systems, flow control valves, recycle pumps, etc. which are not specifically required to illustrate the performance of the process. Furthermore, the illustration of the current process in the embodiment of a specific drawing is not intended to limit the process to specific embodiments set out herein.

As depicted, process flow lines in the FIGURES can be referred to, interchangeably, as, e.g., lines, pipes, branches, distributors, streams, effluents, feeds, products, portions, catalysts, withdrawals, recycles, suctions, and discharges.

Figure 1:
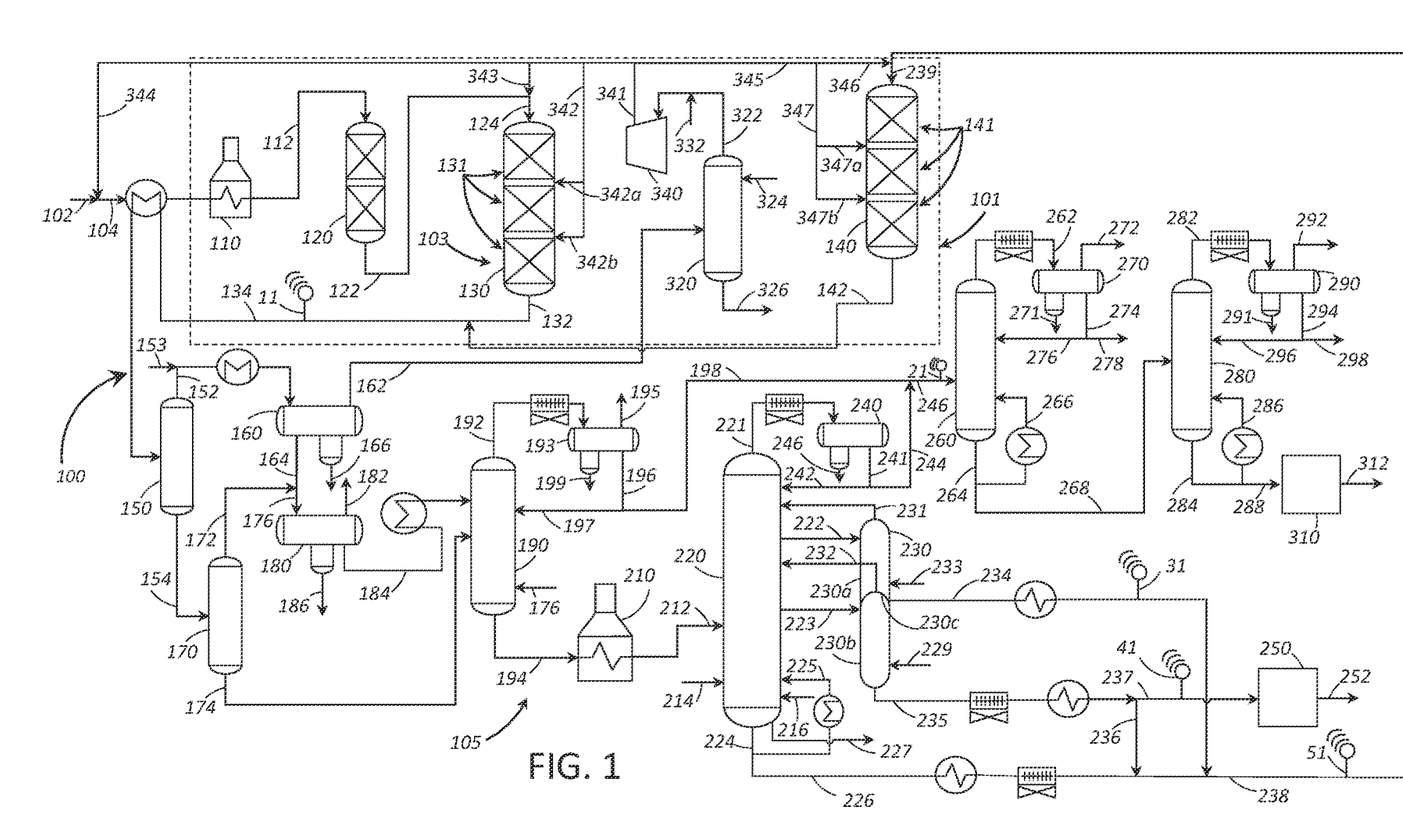
FIG. 1 is a schematic diagram of a hydrocracking process and an apparatus for hydrocracking a hydrocarbon feed stream in accordance with an exemplary embodiment.

A hydrocracking process for hydrocracking a hydrocarbon feed stream in a hydrocracking reactor is addressed with reference to a process and an apparatus 100 according to an embodiment as shown in FIG. 1. Referring to FIG. 1, the process and apparatus 100 comprise a hydroprocessing unit 101 and a fractionation section 105. A hydrocarbon feed stream in line 102 and a hydrogen stream in line 344 are fed to the hydroprocessing unit 101. The hydrocarbon feed stream in line 102 is the fresh feed to the process and apparatus 100 and particularly to the hydroprocessing unit 101. The hydroprocessing unit 101 may comprise a hydrotreating reactor 120 and a hydrocracking unit 103. In an exemplary embodiment, hydrocracking unit 103 may comprises a two stage hydrocracking unit 103 comprising a first stage hydrocracking reactor 130 and a second stage hydrocracking reactor 140.

In one aspect, the hydrocarbon feed stream in line 102 fed to the hydroprocessing unit 101 may comprise hydrocarbon streams having initial boiling points (IBP) above about 288° C. (550° F.), such as atmospheric gas oils, vacuum gas oil (VGO) having T5 and T95 between about 315° C. (600° F.) and about 600° C. (1100° F.), deasphalted oil, coker distillates, straight run distillates, pyrolysis-derived oils, high boiling synthetic oils, cycle oils, hydrocracked feeds, catalytic cracker distillates, atmospheric residue having an IBP at or above about 343° C. (650° F.) and vacuum residue having an IBP above about 510° C. (950° F.).

A compressed hydrogen stream in line 341 is partially provided by a make-up hydrogen stream in line 332 as described hereinafter in detail. The hydrogen stream 344 may be taken from the compressed hydrogen stream in line 341 and join the hydrocarbon feed stream in line 102 as a first hydrogen stream to provide a mixed feed stream in line 104. Another hydrogen stream in line 345 may be taken from the compressed hydrogen stream in line 341 and passed to the second stage hydrocracking reactor 140. The mixed feed stream in line 104 may be heated by heat exchange with a hydrocracked effluent stream in line 134 and in a fired heater 110. A heated hydrocarbon feed stream in line 112 may be fed to the hydrotreating reactor 120.

Hydrotreating is a process wherein hydrogen is contacted with hydrocarbon in the presence of hydrotreating catalysts which are primarily active for the removal of heteroatoms, such as sulfur, nitrogen, oxygen and metals from the hydrocarbon feedstock. In hydrotreating, hydrocarbons with double and triple bonds such as olefins may be saturated. Aromatics may also be saturated. Some hydrotreating processes are specifically designed to saturate aromatics.

In an exemplary embodiment, the hydrotreating reactor 120 may comprise a guard bed of hydrotreating catalyst followed by one or more beds of higher activity hydrotreating catalyst. The guard bed filters particulates and reacts with contaminants in the hydrocarbon feed stream such as metals like nickel, vanadium, silicon and arsenic which are detrimental to the higher activity hydrotreating catalyst. The guard bed may comprise material similar to the hydrotreating catalyst.

Suitable hydrotreating catalysts for use in the present process may include any known conventional hydrotreating catalysts. The hydrotreating catalysts may comprise at least one Group VIII metal including iron, cobalt and nickel, or cobalt and/or nickel and at least one Group VI metal including molybdenum and tungsten, on a high surface area support material such as alumina. Other suitable hydrotreating catalysts may include zeolitic catalysts, as well as noble metal catalysts where the noble metal is selected from palladium and platinum. More than one type of hydrotreating catalyst may be used in the same hydrotreating reactor 120. In an exemplary embodiment, the Group VIII metal may be present in an amount ranging from about 2 wt % to about 20 wt %, or from about 4 wt % to about 12 wt %. In another exemplary embodiment, the Group VI metal may be present in an amount ranging from about 1 wt % to about 25 wt %, or from about 2 wt % to about 25 wt %.

The reaction conditions in the hydrotreating reactor 120 may include a temperature from about 290° C. (550° F.) to about 455° C. (850° F.), or from about 316° C. (600° F.) to about 427° C. (800° F.), a pressure from about 2.1 MPa (gauge) (300 psig), or from 4.1 MPa (gauge) (600 psig) to about 20.6 MPa (gauge) (3000 psig), or to about 12.4 MPa (gauge) (1800 psig), a liquid hourly space velocity of the hydrocarbon feed stream from about 0.1 $hr^{-1}$, or from about 4 $hr^{-1}$, to about 8 $hr^{-1}$, or from about 1.5 $hr^{-1}$ to about 3.5 $hr^{-1}$, and a hydrogen rate of about 168 Nm3/m3 (1,000 scf/bbl), to about 1,011 Nm3/m3 oil (6,000 scf/bbl), or from about 168 Nm3/m3 oil (1,000 scf/bbl) to about 674 Nm3/m3 oil (4,000 scf/bbl), with a hydrotreating catalyst or a combination of hydrotreating catalysts. The hydrotreating reactor 120 provides a hydrotreated hydrocarbon feed stream that exits the hydrotreating reactor 120 in line 122. The hydrogen gas laden with ammonia and hydrogen sulfide may be removed from the hydrotreated hydrocarbon feed stream in a separator, but the hydrotreated hydrocarbon feed stream in line 122 is typically fed directly to the hydrocracking unit 103 without separation. The hydrotreated hydrocarbon feed stream in line 122 may be mixed with a hydrocracking hydrogen stream in line 343 taken from the compressed hydrogen line 341 to provide a mixed hydrotreated hydrocarbon feed stream in line 124. In exemplary embodiment, the mixed hydrotreated hydrocarbon feed stream in line 124 may be passed to the first stage hydrocracking reactor 130 of the hydrocracking unit 103. The hydrocarbon feed stream in the mixed hydrotreated hydrocarbon feed stream in line 124 is hydrocracked in the presence of the first hydrogen stream and a hydrocracking catalyst to produce a hydrocracked effluent stream.

The first stage hydrocracking reactor 130 may be a fixed bed reactor that comprises single or multiple catalyst beds, and various combinations of hydrotreating catalyst, and/or hydrocracking catalyst. The first stage hydrocracking reactor 130 may be operated in a continuous liquid phase in which the volume of the liquid hydrocarbon feed stream is greater than the volume of the hydrogen gas. The first stage hydrocracking reactor 130 may also be operated in a conventional continuous gas phase, a moving bed or a fluidized bed hydroprocessing reactor.

The first stage hydrocracking reactor 130 may comprise a plurality of a first hydrocracking catalyst beds 131. If the hydroprocessing unit 101 does not include a hydrotreating reactor 120, the first bed 131 in the first stage hydrocracking reactor 130 may include hydrotreating catalyst for the purpose of saturating, demetallizing, desulfurizing, deoxygenating or denitrogenating the hydrocarbon feed before it is hydrocracked with hydrocracking catalyst in subsequent catalyst beds in the hydrocracking reactor 130. Otherwise, the first or an upstream bed in the first stage hydrocracking reactor 130 may comprise a hydrocracking catalyst bed.

The first hydrocracking catalyst in beds 131 includes the hydrocracking catalyst that may utilize amorphous silica-alumina bases or low-level zeolite bases combined with one or more Group VIII or Group VIB metal hydrogenating components if mild hydrocracking is desired. In another aspect, partial or full hydrocracking may be performed in the first stage hydrocracking reactor 130 with a catalyst which comprises, in general, any crystalline zeolite cracking base upon which is deposited a Group VIII metal hydrogenating component. Additional hydrogenating components may be selected from Group VIB for incorporation with the zeolite base.

The zeolite cracking bases are sometimes referred to in the art as molecular sieves and are usually composed of silica, alumina and one or more exchangeable cations such as sodium, magnesium, calcium, rare earth metals, etc. They are further characterized by crystal pores of relatively uniform diameter between about 4 and about 14 Angstroms. It is preferred to employ zeolites having a relatively high silica/alumina mole ratio between about 3 and about 12. Suitable zeolites found in nature include, for example, mordenite, stilbite, heulandite, ferrierite, dachiardite, chabazite, erionite and faujasite. Suitable synthetic zeolites include, for example, the B, X, Y and L crystal types, e.g., synthetic faujasite and mordenite. The preferred zeolites are those having crystal pore diameters between about 8 and 12 Angstroms ($10^{-10}$ meters), wherein the silica/alumina mole ratio is about 4 to 6. One example of a zeolite falling in the preferred group is synthetic Y molecular sieve.

The natural occurring zeolites are normally found in a sodium form, an alkaline earth metal form, or mixed forms. The synthetic zeolites are nearly always prepared first in the sodium form. In any case, for use as a cracking base it is preferred that most or all of the original zeolitic monovalent metals be ion-exchanged with a polyvalent metal and/or with an ammonium salt followed by heating to decompose the ammonium ions associated with the zeolite, leaving in their place hydrogen ions and/or exchange sites which have actually been decationized by further removal of water.

Mixed polyvalent metal-hydrogen zeolites may be prepared by ion-exchanging first with an ammonium salt, then partially back exchanging with a polyvalent metal salt and then calcining. In some cases, as in the case of synthetic mordenite, the hydrogen forms can be prepared by direct acid treatment of the alkali metal zeolites. In one aspect, the preferred cracking bases are those which are at least about 10 wt %, and preferably at least about 20 wt %, metal-cation-deficient, based on the initial ion-exchange capacity. In another aspect, a desirable and stable class of zeolites is one wherein at least about 20 wt % of the ion exchange capacity is satisfied by hydrogen ions.

In an aspect, the active metals employed in the hydrocracking catalysts of the present process as hydrogenation components are those of Group VIII, i.e., iron, cobalt, nickel, ruthenium, rhodium, palladium, osmium, iridium and platinum. In addition to these metals, other promoters may also be employed in conjunction therewith, including the metals of Group VIB, e.g., molybdenum and tungsten. The amount of hydrogenating metal in the catalyst can vary within wide ranges. In an aspect, any amount between about 0.05 wt % and about 35 wt % may be used. In the case of the noble metals such as platinum and palladium, the amount of such metals may range from about 0.05 wt % to about 2 wt % noble metal.

One such method for incorporating the hydrogenation metal is to contact the base materials with an aqueous solution of a suitable compound of the desired metals. Following addition of the selected hydrogenation metal or metals, the resulting catalyst powder is extruded, dried, and calcined in air at temperatures of, e.g., about 371° C. (700° F.) to about 648° C. (1200° F.) in order to condition the base and oxidize the metals. Alternatively, the base component may first be pelleted and calcined, followed by the addition of the hydrogenation component and oxidation of the hydrogenation components.

Other relatively less active components may be incorporated into hydrocracking catalysts such as diluents or binders such as alumina, silica gel, silica-alumina co-gels, activated clays and the like in proportions ranging from about 5 to about 90 wt %. These diluents may be employed as such or they may contain a minor proportion of an added hydrogenating metal such as a Group VIB and/or Group VIII metal. Additional metal promoted hydrocracking catalysts may also be utilized in the present process which comprises, for example, aluminophosphate molecular sieves, crystalline chromosilicates and other crystalline silicates.

In an embodiment, the hydrocracking conditions may include a temperature from about 290° C. (550° F.) to about 468° C. (875° F.), or from about 343° C. (650° F.) to about 445° C. (833° F.). In another embodiment, the first stage hydrocracking reactor 130 may operate at a first hydrocracking pressure from about 4.8 MPa (gauge) (700 psig) to about 20.7 MPa (gauge) (3000 psig), a liquid hourly space velocity (LHSV) from about 0.4 $hr^{-1}$ to less than about 5 $hr^{-1}$ and a hydrogen rate of about 421 Nm3/m3 (2,500 scf/bbl) to about 2,527 Nm3/m3 oil (15,000 scf/bbl).

The hydrocarbon feed stream in the mixed hydrotreated hydrocarbon feed stream in line 124 is hydrocracked in the first stage hydrocracking reactor 130 operating at the first hydrocracking pressure in the presence of the first hydrogen stream passed in line 344 and the first hydrocracking catalyst to produce a first hydrocracked stream in line 132. The mixed hydrotreated hydrocarbon feed stream in line 124 is first passed to the top catalyst bed of the first hydrocracking catalyst. Subsequent catalyst beds in the first stage hydrocracking reactor 130 may comprise hydrocracking catalyst over which additional hydrocracking occurs to the first hydrocracked stream. A hydrogen manifold 342 may deliver supplemental hydrogen streams 342a and 342b to one, some or each of the catalyst beds in the first stage hydrocracking reactor 130. In an aspect, the supplemental hydrogen is added to each of the catalyst beds at an interstage location between adjacent beds, so supplemental hydrogen is mixed with hydroprocessed effluent exiting from the upstream catalyst bed before entering the downstream catalyst bed in the first stage hydrocracking reactor 130. A first hydrocracked effluent stream in line 132 is withdrawn from the bottoms of the first stage hydrocracking reactor 130. The first hydrocracked effluent stream in line 132 may be passed to the fractionation section 105 for separation. In an exemplary embodiment, a second hydrocracked effluent stream in line 142 may be combined with the first hydrocracked effluent stream in line 132 to provide a combined hydrocracked effluent stream in line 134. The combined hydrocracked effluent stream in line 134 may be passed to the fractionation section 105 for separation. The fractionation section 105 may comprise one or more separators and fractionation columns in downstream communication with the hydrocracking unit 103. In an exemplary embodiment, the first hydrocracked effluent stream in line 132 and a second hydrocracked effluent stream in line 142 may be separated in a separator of the fractionation section 105 to provide a vapor hydrocracked stream in line 192 and a liquid hydrocracked stream in line 194.

The combined hydrocracked effluent stream in line 134 may in an aspect be heat exchanged with the hydrocarbon feed stream in line 102 to be cooled before entering a hot separator 150. After cooling, the combined hydrocracked effluent stream in line 134 may be passed to the hot separator 150 to provide a hot separated vapor hydrocracked stream in line 152 and a hot separated liquid hydrocracked stream in line 154. The hot separated vapor hydrocracked stream in line 152 is withdrawn from the overhead of the hot separator 150. The hot separated liquid hydrocracked stream in line 154 is withdrawn from the bottoms of the hot separator 150.

The hot separator 150 may be in downstream communication with the hydrocracking unit 103. The hot separator 150 may operate at a temperature from about 177° C. (350° F.) to about 371° C. (700° F.) or from about 232° C. (450° F.) to about 315° C. (600° F.). The hot separator 150 may be operated at a slightly lower pressure than the first stage hydrocracking reactor 130 accounting for pressure drop through intervening equipment. The hot separator 150 may be operated at a pressure from about 3.4 MPa (gauge) (493 psig) and about 20.4 MPa (gauge) (2959 psig). The hot separated vapor hydrocracked stream in line 152 from the overhead of the hot separator 150 may have a temperature of the operating temperature of the hot separator 150.

The hot separated vapor hydrocracked stream in line 152 may be cooled before entering a cold separator 160. As a consequence of the reactions taking place in the first stage hydrocracking reactor 130 wherein nitrogen, chlorine and sulfur are removed from the feed, ammonia and hydrogen sulfide are formed. At a characteristic sublimation temperature, ammonia and hydrogen sulfide will combine to form ammonium bisulfide and ammonia, and chlorine will combine to form ammonium chloride. Each compound has a characteristic sublimation temperature that may allow the compound to coat equipment, particularly heat exchange equipment, impairing its performance. To prevent such deposition of ammonium bisulfide or ammonium chloride salts in the hot separated vapor hydrocracked stream in line 152, a suitable amount of wash water in line 153 may be introduced into the hot separated vapor hydrocracked stream in line 152 upstream of a cooler at a point in the hot separated vapor hydrocracked stream in line 152 where the temperature is above the characteristic sublimation temperature of either compound.

The hot separated vapor hydrocracked stream in line 152 may be passed to a cold separator 160 to provide a cold separated vapor hydrocracked stream in line 162 and a cold separated liquid hydrocracked stream in line 164. The cold separated vapor hydrocracked stream in line 162 is withdrawn from the overhead of the cold separator 160. The cold separated liquid hydrocracked stream in line 164 is withdrawn from the bottoms of the cold separator 160.

The cold separated vapor hydrocracked stream in line 162 is a hydrogen-rich gas stream which can be recovered to be used as hydrogen gas stream in the process. The cold separator 160 serves to separate hydrogen rich gas from the hot separated vapor hydrocracked stream in line 152 for recycle to the hydrocracking unit 103 in the cold separated vapor hydrocracked stream in line 162. The cold separator 160, therefore, is in downstream communication with the hot separated vapor hydrocracked stream in line 152 of the hot separator 150 and the hydrocracking unit 103. The cold separator 160 may be operated at a temperature from about 38° C. (100° F.) to about 66° C. (150° F.), or from about 46° C. (115° F.) to about 63° C. (145° F.), and below the pressure of the first stage hydrocracking reactor 130 and the hot separator 150 accounting for pressure drop through intervening equipment to keep hydrogen and light gases in the overhead and normally liquid hydrocarbons in the bottoms. The cold separator 160 may be operated at pressures between about 3 MPa (gauge) (435 psig) and about 20 MPa (gauge) (2,901 psig). The cold separator 160 may also have a boot for collecting an aqueous phase in line 166. The cold separated liquid hydrocracked stream in line 164 may have a temperature of the operating temperature of the cold separator 160.

The cold separated vapor hydrocracked stream in line 162 is rich in hydrogen. Thus, hydrogen can be recovered from the cold separated vapor hydrocracked stream in line 162. The cold separated vapor hydrocracked stream in line 162 may be passed through a trayed or packed recycle scrubbing column 320 where it is scrubbed by means of a scrubbing extraction liquid such as an aqueous solution fed by line 324 to remove acid gases including hydrogen sulfide and carbon dioxide by extracting them into the aqueous solution. In an exemplary embodiment, the aqueous solution in line 324 may include lean amines such as alkanolamines DEA, MEA, and MDEA. Other amines can also be used in place of or in addition to these amines. The lean amine fed by line 324 contacts the cold separated vapor hydrocracked stream in line 162 and absorbs acid gas contaminants such as hydrogen sulfide and carbon dioxide. The resultant "sweetened" cold gaseous stream is taken out from an overhead outlet of the recycle scrubber column 320 in a recycle scrubber overhead line 322, and a rich amine is taken out from the bottoms at a bottom outlet of the recycle scrubber column 320 in a recycle scrubber bottoms line 326. The spent scrubbing liquid from the bottoms in line 326 may be regenerated and recycled back to the recycle scrubbing column 320 in line 324. The scrubbed hydrogen-rich stream emerges from the scrubber via the recycle scrubber overhead line 322. The scrubbed hydrogen-rich stream in the recycle scrubber overhead line 322 may be compressed in a recycle compressor 340 to provide the compressed hydrogen stream in line 341. The scrubbed hydrogen-rich stream in the recycle scrubber overhead line 322 may be supplemented with a make-up hydrogen stream in the make-up line 332 upstream or downstream of the compressor 70. In exemplary embodiment, the make-up hydrogen stream in the make-up line 332 is combined with the scrubbed hydrogen-rich stream in the recycle scrubber overhead line 322 and passed to the recycle compressor 340 to provide the compressed hydrogen stream in line 341. The recycle scrubbing column 320 may be operated with a gas inlet temperature from about 38° C. (100° F.) and about 66° C. (150° F.) and an overhead pressure of about 3 MPa (gauge) (435 psig) to about 20 MPa (gauge) (2900 psig).

The cold separated liquid hydrocracked stream in line 164 may be fractionated. In an aspect, the hot separated liquid hydrocracked stream in line 154 may be let down in pressure and flashed in a hot flash drum 170 to provide a hot vapor hydrocracked stream in line 172 and a hot liquid hydrocracked stream in line 174. The light ends get separated in hot vapor hydrocracked stream in line 172 which may be withdrawn from the overhead of the hot flash drum 170. The hot liquid hydrocracked stream in line 174 may be withdrawn from the bottom of the hot flash drum 170. Accordingly, the hot liquid hydrocracked stream in line 174 may be provided from the hot separator 150. The hot flash drum 170 may be in direct, downstream communication with the hot separated liquid hydrocracked stream in line 154 and in downstream communication with the hydrocracking unit 103. The light gases such as hydrogen sulfide may be stripped from the hot liquid hydrocracked stream in line 174 in a stripper to provide a liquid hydrocracked stream. In an embodiment, the hot liquid hydrocracked stream in line 174 may be stripped in a stripping column 190 to provide a liquid hydrocracked stream. The stripping column 190 may be in downstream communication with the hot flash drum 170 and the hot liquid hydrocracked stream in line 174.

The hot flash drum 170 may be operated at the same temperature as the hot separator 150 but at a lower pressure of between about 1.4 MPa (gauge) (200 psig) and about 6.9 MPa (gauge) (1000 psig), suitably no more than about 3.8 MPa (gauge) (550 psig). The hot liquid hydrocracked stream in line 174 may be further fractionated in the fractionation section 14. The hot liquid hydrocracked stream in line 174 may have a temperature of the operating temperature of the hot flash drum 170.

In an aspect, the cold separated liquid hydrocracked stream in line 164 may be directly fractionated. In a further aspect, the cold separated liquid hydrocracked stream in line 164 may be let down in pressure and flashed in a cold flash drum 180 to separate the cold separated liquid hydrocracked stream in line 164. The cold flash drum 180 may be in direct downstream communication with the cold separated liquid hydrocracked stream in line 164 of the cold separator 160 and in downstream communication with the hydrocracking unit 103.

In a further aspect, the hot vapor hydrocracked stream in 172 may be fractionated in the fractionation section 105. In a further aspect, the hot vapor hydrocracked stream in 172 may be cooled and also separated in the cold flash drum 180. The cold flash drum 180 may separate the cold separated liquid hydrocracked stream in line 164 and the hot vapor hydrocracked stream in 172 to provide a cold vapor stream in line 182 and a cold liquid stream in line 184. The cold vapor stream in line 182 may be withdrawn from an overhead of the cold flash drum 180. The cold liquid stream in line 184 may be withdrawn from the bottoms of the cold flash drum 180. In an embodiment, the cold separated liquid hydrocracked stream in line 164 and the hot vapor hydrocracked stream in 172 may be combined to provide a combined separated stream in line 176. The combined separated stream in line 176 may be separated in the cold flash drum 180 to provide the cold vapor stream in line 182 and the cold liquid stream in line 184. In an aspect, light gases such as hydrogen sulfide may be stripped from the cold liquid stream in line 184. In An embodiment, the cold liquid stream in line 184 may be stripped in the stripper 190 to provide the liquid hydrocracked stream. The stripping column 190 may be in downstream communication with the cold flash drum 180 and the cold liquid stream in line 184.

The cold flash drum 180 may be in downstream communication with the cold separated liquid hydrocracked stream in line 164 of the cold separator 160, the hot vapor hydrocracked stream in line 172 of the hot flash drum 170 and the hydrocracking unit 103. The cold separated liquid hydrocracked stream in line 164 and the hot vapor hydrocracked stream in 172 may enter into the cold flash drum 180 either together or separately. The cold flash drum 180 may be operated at the same temperature as the cold separator 160 but typically at a lower pressure of between about 1.4 MPa (gauge) (200 psig) and about 6.9 MPa (gauge) (1000 psig) or between about 3.0 MPa (gauge) (435 psig) and about 3.8 MPa (gauge) (550 psig). A flashed aqueous stream may be removed from a boot in the cold flash drum 180 in line 186. The cold liquid stream in line 184 may have the same temperature as the operating temperature of the cold flash drum 180. The cold vapor stream in line 182 contains substantial hydrogen that may be recovered.

The fractionation section 14 may further include the stripping column 190, a fractionation column 220 and a side cut stripper column 230. The stripping column 190 for stripping volatiles from the hot liquid hydrocracked stream in line 174 may be in downstream communication with a bottoms line in the fractionation column 220. For example, the stripping column 190 may be in downstream communication with the hot separated liquid hydrocracked stream in line 154, the hot liquid hydrocracked stream in line 174, the cold separated liquid hydrocracked stream in line 164 and/or the cold liquid stream in line 184. In an aspect, the stripping column 190 may be a vessel that contains a cold stripping column (not shown) and a hot stripping column (not shown) with a wall that isolates each of the stripping columns from the other. In an embodiment, the cold liquid stream in line 184 and the hot liquid hydrocracked stream in line 174 may be stripped in the stripping column 190 to provide the liquid hydrocracked stream in line 194.

The cold liquid stream in line 184 may be heated and fed to the stripping column 190. The cold liquid stream in line 184 may be fed to the stripping column 190 at a location above an entry point of the hot liquid hydrocracked stream in line 174 into the stripping column 190. The cold liquid stream in line 184 and the hot liquid hydrocracked stream in line 174 may be stripped of gases in the stripping column 190 with a stripping media which is an inert gas such as steam from a stripping media line 176 to provide a gaseous stream of naphtha, hydrogen, hydrogen sulfide, steam and other gases in a vapor hydrocracked stream in line 192. The vapor hydrocracked stream in line 192 may be withdrawn from the overhead of the stripping column 190. The vapor hydrocracked stream in line 192 from the overhead may be condensed and separated in a receiver 193. A stripper net overhead line 195 from the receiver 193 carries a net stripper gaseous stream for further recovery of LPG and hydrogen in a light material recovery unit. Unstabilized liquid naphtha from the bottoms of the receiver 193 may be split between a reflux portion refluxed to the top of the stripping column 190 in a reflux line 197 and a liquid stripper overhead stream in line 198 which may be transported to further recovery or processing. A sour water stream in line 199 may be collected from a boot of the overhead receiver 193. In an aspect, the liquid stripper overhead stream in line 198 may be passed to a debutanizer column 260 to separate LPG from light naphtha.

The stripping column 190 may be operated at a temperature between about 160° C. (320° F.) and about 360° C. (680° F.) or a temperature between about 149° C. (300° F.) and about 288° C. (550° F.), or a temperature of no more than about 260° C. (500° F.), and an overhead pressure of about 0.35 MPa (gauge) (50 psig), or an overhead pressure of no less than about 0.70 MPa (gauge) (100 psig), to an overhead pressure of no more than about 2.0 MPa (gauge) (290 psig). The temperature in the overhead receiver 193 ranges from about 38° C. (100° F.) to about 66° C. (150° F.) and the pressure is essentially the same as in the overhead of the stripping column 190. The liquid hydrocracked stream in line 194 may be withdrawn from the bottoms of the stripping column 190 and fractionated in the fractionation column 220. In an exemplary embodiment, the liquid hydrocracked stream in line 194 may be heated in a fractionation furnace 210 to provide a heated liquid hydrocracked stream in line 212. The heated liquid hydrocracked stream in line 212 may be fractionated in the fractionation column 220. The fractionation column 220 may be in a downstream communication with the stripping column 190. The fractionation column 220 separates the heated liquid hydrocracked stream in line 212 into different products. In an exemplary embodiment, liquid hydrocracked stream in line 194 may be fractionated in the fractionation column 220 to provide a naphtha stream, a kerosene stream, a diesel stream and an unconverted oil (UCO) stream. The heated liquid hydrocracked stream in line 212 may be fractionated in the fractionation column 220 to provide the fractionated overhead stream in line 221, a first side cut stream comprising kerosene in line 222, a second side cut stream comprising diesel in line 223, and the unconverted oil (UCO) stream in line 224. The fractionated overhead stream in line 221 is further processed to provide the naphtha stream. The first side cut stream comprising kerosene in line 222, and the second side cut stream comprising diesel in line 223 may be passed to the side cut stripper column 230.

In an aspect, the side cut stripper column 230 may be a vessel that contains a top stripping column 230a and a bottom stripping column 230b with a wall 230c that isolates each of the stripping columns 230a and 230b from the other. The first side cut stream comprising kerosene in line 222 may fed to the top stripping column 230a at an inlet which may be in a top half of the top stripping column 230a. The first side cut stream comprising kerosene in line 222 may be stripped of gases in the top stripping column 230a with a stripping media which may an inert gas such as steam in line 233 to provide a top stripped gaseous stream. A stripper net overhead line 231 carries a net stripper gaseous stream for further recovery. The net stripper gaseous stream in the stripper net overhead line 231 may be passed to the fractionation column 220 for further recovery of materials. The net stripper gaseous stream in the stripper net overhead line 231 may comprise predominantly naphtha and to some extent kerosene boiling materials. Further, a kerosene stream in line 234 may be withdrawn from the bottom of the top stripping column 230a. In accordance with an aspect of the present process, the kerosene stream in line 234 obtained from the top stripping column 230a may have a T90 temperature ranging from about 204° C. (400° F.) to about 238° C. (460° F.) or from about 210° C. (410° F.) to about 233° C. (450° F.). In accordance with another aspect of the present process, the kerosene stream in line 234 may be recycled to the hydrocracking unit 103. In accordance with an exemplary embodiment of the present process, the kerosene stream in line 234 may be recycled to the second stage hydrocracking reactor 140. The kerosene stream in line 234 recycled to the hydrocracking unit 103 may range from about 4 wt % to about 30 wt % of the hydrocarbon feed stream, or from about 5 wt % to about 24 wt % of the hydrocarbon feed stream, or from about 6 wt % to about 20 wt % of the hydrocarbon feed stream or from about 7 wt % to about 15 wt % of the hydrocarbon feed stream.

The second side cut stream comprising diesel in line 223 may fed to the bottom stripping column 130b near a top thereof. The second side cut stream comprising diesel in line 223 may be stripped of gases in the bottom stripping column 230b with a stripping media which may an inert gas such as steam in line 229 to provide an overhead stripped gaseous stream in line 232. The overhead stripped gaseous stream in line 232 may be fed to the fractionation column 220 for further recovery of materials. Also, a diesel stream may be withdrawn in a bottoms line 235 from the bottom stripping column 130b. In accordance with an aspect of the present process, the diesel stream withdrawn in a bottoms line 235 from the bottom stripping column 130b may have a T90 temperature ranging from about 360° C. (680° F.) to about 383° C. (720° F.). In accordance with another aspect of the present process, the diesel stream withdrawn in a bottoms line 235 from the bottom stripping column 130b has a T5 temperature ranging from about 204° C. (400° F.) to about 238° C. (460° F.) or from about 210° C. (410° F.) to about 233° C. (450° F.). In accordance with yet another aspect of the present process, a portion of the diesel stream in line 235 may be recycled to the hydrocracking unit 103. In an embodiment the diesel stream in line 235 may be passed to a dryer 250 to provide a diesel product stream in line 252. In an exemplary embodiment, the diesel stream in line 235 may be first split before passing to the dryer 250 to provide a portion of the diesel stream for recycling in line 236. The remaining portion in line 237 may be passed to the dryer 250 to provide the diesel product stream in line 252. The diesel product stream in line 252 may range from about 5 wt % to about 40 wt % of the hydrocarbon feed stream or from about 8 wt % to about 35 wt % of the hydrocarbon feed stream or from about 10 wt % to about 20 wt % of the hydrocarbon feed stream or from about 12 wt % to about 18 wt % of the hydrocarbon feed stream. In accordance with the present process, the diesel stream in line 235 may be split before passing to the dryer 250. In an embodiment, a portion of the diesel stream in line 235 may be recycled to the second stage hydrocracking reactor 140 in line 236. In accordance with an exemplary embodiment of the present process, the portion of the diesel stream recycled to the hydrocracking reactor in line 236 may range from about 5 wt % to about 30 wt % of the hydrocarbon feed stream, or from about 10 wt % to about 25 wt % of the hydrocarbon feed stream, or from about 10 wt % to about 20 wt % of the hydrocarbon feed stream or from about 11 wt % to about 18 wt % of the hydrocarbon feed stream.

Referring back to the fractionation column 220, an unconverted oil stream in line 224 may also be withdrawn from the bottoms of the fractionation column 220. A portion of the unconverted oil stream may be withdrawn as a UCO boilup stream in a reboil line 225. The UCO boilup stream in the reboil line 225 is returned to the fractionation column 220 after reboiling. A purge stream comprising heavy polynuclear aromatics (HPNA) may also be withdrawn from the fractionation column 220 in line 227. In an exemplary embodiment of the present process, the purge stream comprising HPNA in line 227 may range from about 0 wt % to about 5 wt % of the hydrocarbon feed stream or from about 0.1 wt % to about 2 wt % of the hydrocarbon feed stream or from about 0.2 wt % to about 1 wt % of the hydrocarbon feed stream. The purge stream comprising HPNA in line 227 is the net UCO stream from the fractionation column 220. A UCO stream in line 226 may be withdrawn from the fractionation column 220. In an aspect, the UCO stream in line 226 may be combined with the kerosene stream in line 234 and the recycled portion of the diesel stream in line 236 to provide a combined recycle stream in line 238 which is recycled to the hydrocracking unit 103. In accordance with an exemplary embodiment of the present process, the combined recycle stream in line 238 recycled to the hydrocracking unit 103 may range from about 40 wt % to about 90 wt % of the hydrocarbon feed stream, or from about 45 wt % to about 85 wt % of the hydrocarbon feed stream, or from about 50 wt % to about 82 wt % of the hydrocarbon feed stream or from about 60 wt % to about 80 wt % of the hydrocarbon feed stream or from about 70 wt % to about 80 wt % of the hydrocarbon feed stream.

In an exemplary embodiment, the combined recycle stream in line 238 comprising the kerosene stream in line 234, the recycled portion of the diesel stream in line 236, and the UCO stream in line 226 may be recycled to the second stage hydrocracking reactor 140 of the hydrocracking unit 103. The combined recycle stream in line 238 may be hydrocracked in the second stage hydrocracking reactor 140 in the presence of the second hydrogen stream in line 346 and a second hydrocracking catalyst to produce the second hydrocracked effluent stream in line 142. The second stage hydrocracking reactor 140 receives the second hydrogen stream in line 346 which may be taken from the hydrogen stream in line 345. The kerosene stream in line 234, the unconverted oil stream in line 226, and the recycled portion of the diesel stream in line 236 are hydrocracked in the second stage hydrocracking reactor 140 in the presence of the second hydrogen stream in line 346 and a second hydrocracking catalyst to produce the second hydrocracked effluent stream in line 142. The second hydrogen stream in line 346 may be taken from the compressed hydrogen stream in line 341.

The second stage hydrocracking reactor 140 may comprise a plurality of second hydrocracking catalyst beds 141. Suitable second hydrocracking catalyst may comprise one or more of the hydrocracking catalysts as described earlier for the first hydrocracking catalyst. A second hydrogen manifold 347 provides supplemental hydrogen streams in line 347a and 347b to some or all of the catalyst beds 141 at the interbed locations. The second hydrocracked effluent stream in line 142 may be withdrawn from the bottom of the second stage hydrocracking reactor 140. The second hydrocracked effluent stream in line 142 may be passed to the fractionation section 105. In an aspect, the second hydrocracked effluent stream in line 142 may be combined with the first hydrocracked effluent stream in line 132 to provide the combined hydrocracked effluent stream in line 134 which is passed to the hot separator 150 for separation. The first hydrocracked effluent stream in line 132 and the second hydrocracked effluent stream in line 142 may be separated together in the fractionation section 105 to provide the vapor hydrocracked stream in line 192 and the liquid hydrocracked stream in line 194.

In accordance with an aspect of the present process, the fractionated overhead stream in line 221 is further processed to provide the naphtha stream. The fractionated overhead stream in line 221 may be condensed and separated in a receiver 240 with a portion of the condensed liquid in line 241 being refluxed back to the fractionation column 220 in a reflux line 242. A net fractionated overhead stream in line 244 may be further processed or recovered as naphtha product stream.

In an embodiment, the net fractionated overhead stream in line 244 along with the liquid stripper overhead stream in line 198 may be passed to the debutanizer column 260 to recover naphtha product stream. In a non-limiting aspect, any suitable method may be employed to recover a naphtha product stream from the net fractionated overhead stream in line 244 and the liquid stripper overhead stream in line 198. In an exemplary embodiment, the net fractionated overhead stream in line 244 and the liquid stripper overhead stream in line 198 may be combined to provide a net overhead stream in line 246. The net overhead stream in line 246 may be passed to the debutanizer column 260 to recover naphtha product stream 268. The debutanizer column 260 may separate the net fractionated overhead stream in line 244 and the liquid stripper overhead stream in line 198 to provide a debutanizer overhead stream comprising LPG and a debutanized bottoms stream comprising light naphtha. An overhead stream in line 262 from the debutanizer column 260 may be cooled and separated in a receiver 270 to provide an overhead gas stream comprising C2 and lighter gases in a debutanizer off-gas stream in a debutanizer off-gas line 272 and a debutanizer liquid overhead stream comprising LPG in line 274. A portion of the debutanizer liquid overhead stream in line 274 may be recycled to the debutanizer column 260 in a debutanizer reflux line 276. A net debutanizer overhead liquid stream comprising LPG is withdrawn in a net debutanizer overhead liquid line 278. A debutanized bottoms stream in line 264 from the debutanizer column 260 may be split between a debutanized boilup stream in a debutanized reboil line 266 and a net debutanized bottoms stream in line 268. The debutanized boilup stream in the debutanized reboil line 266 is returned to the debutanizer column 260 after reboiling. The debutanizer column 260 may be operated at a temperature between about 121° C. (250° F.) and about 177° C. (350° F.) and a pressure between about 690 kPa (100 psig) and about 1379 kPa (200 psig). The net debutanized bottoms stream in line 268 comprises more light naphtha than the net debutanizer overhead liquid stream comprising LPG in the net debutanizer overhead liquid line 278. The debutanizer net liquid overhead liquid stream comprising LPG in the net debutanizer overhead liquid line 278 may comprise between about 10 mol % and about 30 mol % propane and between about 60 mol % and about 90 mol % butane.

The net debutanized bottoms stream in line 268 may be passed to a naphtha splitter column 280 to separate light naphtha from heavy naphtha. The naphtha splitter column 280 separates the net debutanized bottoms stream in line 268 to provide an overhead stream comprising light naphtha in line 282 and a bottoms stream comprising heavy naphtha in line 284. The overhead stream comprising light naphtha in line 282 from the naphtha splitter column 280 may be cooled and separated in a receiver 290 to provide an overhead gas stream comprising lighter gases in an off-gas stream in off-gas line 292 and an overhead liquid stream comprising light naphtha in line 294. In an embodiment, the naphtha splitter column 280 may be a totally condensing column and does not produce an off-gas stream 292. A portion of the overhead liquid stream in line 294 may be recycled back to the naphtha splitter column 280 in a reflux line 296. The light naphtha stream is withdrawn in a net overhead liquid line 298. The bottoms stream comprising heavy naphtha in line 284 from the naphtha splitter column 280 may be split between a boilup stream in a reboil line 286 and a net bottoms stream in line 288. The boilup stream in the reboil line 286 is returned to the naphtha splitter column 280 after reboiling. The net bottoms stream in line 288 may passed to a sulfur guard bed 310 to remove sulfur and provide heavy naphtha bottoms stream in line 312 which may be withdrawn for further use.

In an aspect, the fractionation section 105 may comprise more than one fractionation column. In such an aspect, the heated liquid hydrocracked stream in line 212 may be first passed to an atmospheric fractionation column (not shown). The atmospheric fractionation column may separate the heated liquid hydrocracked stream in line 212 into an overhead naphtha stream and an atmospheric column bottoms stream. The atmospheric column bottoms stream may be further fractionated in a vacuum fractionation column operating at below atmospheric pressure. The vacuum fractionation column may separate the atmospheric column bottoms stream into the kerosene stream 234, the diesel stream 235, and the UCO stream 224 which are recycled and processed as described herein above.

The process and apparatus 100 provides a solution to unsatisfactory diesel properties for operation in regular two-stage flows with high naphtha yield. Such processes may produce diesel that does not meet the given specification including one or more of China VI diesel and Euro V diesel specification which have low specific gravity and/or low cetane value. Applicants process addresses this problem by fractionating the recycle oil into three cuts including a light cut of the kerosene stream in line 234, a medium or heart cut of diesel stream in line 235 and a heavy cut of UCO stream in line 226. The heart cut of diesel stream withdrawn in line 252 as described above meets all the fuel specification while operating under high naphtha yield unlike usual processes. The light cut of the kerosene stream in line 234 and heavy cut of UCO stream in line 226 are recycled for hydrocracking with a portion of the heart cut of diesel stream in 236. The current process and apparatus 100 provides heart cut diesel stream as a diesel product stream in line 252 in an amount from about 5 wt % to about 40 wt % of the hydrocarbon feed stream meeting the fuel specification for China VI diesel and Euro V diesel specification.

Figure 2:
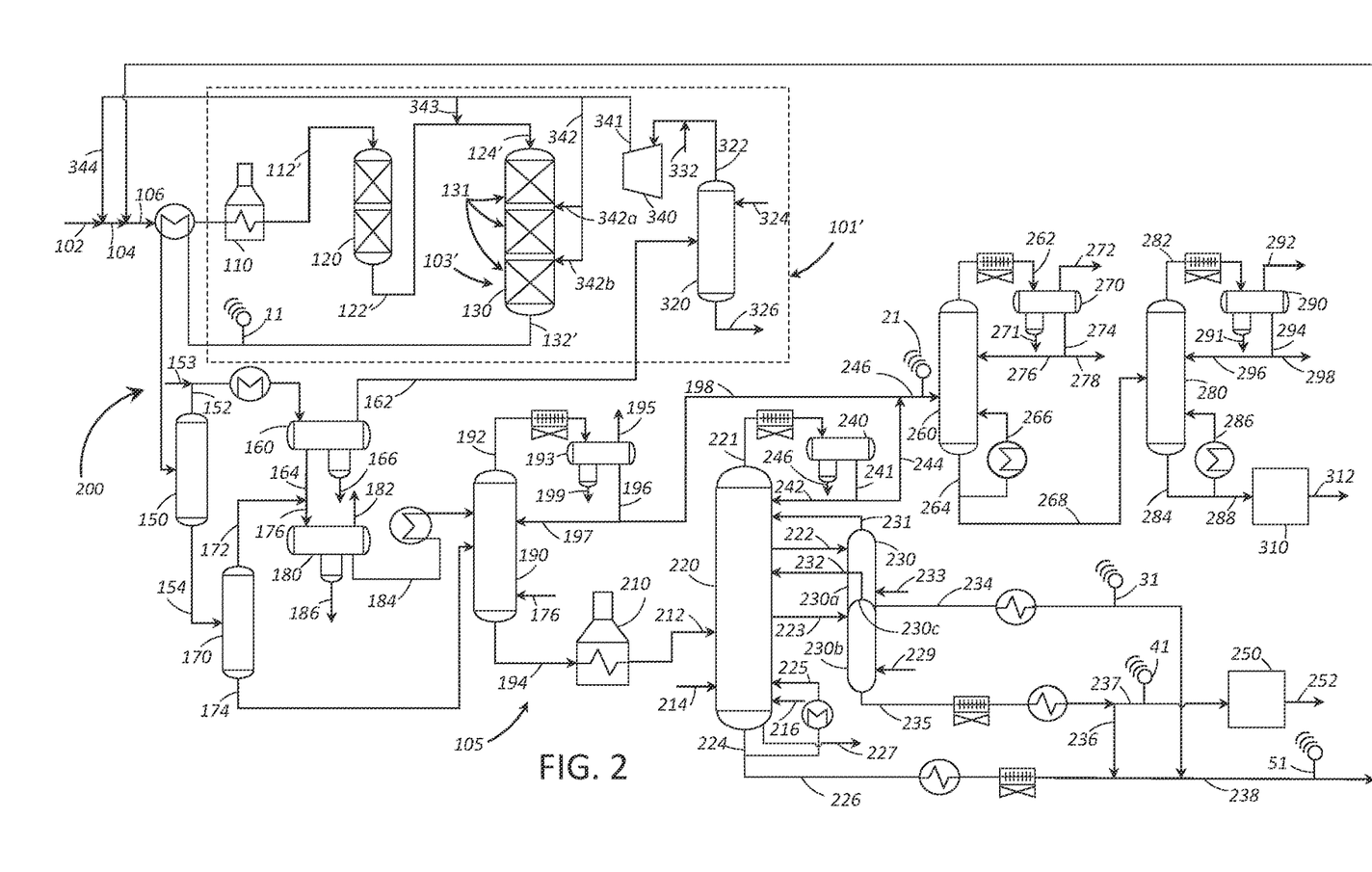
FIG. 2 is a schematic diagram of a hydrocracking process and an apparatus for hydrocracking a hydrocarbon feed stream in accordance with another exemplary embodiment.

Turning now to FIG. 2, another exemplary embodiment of the hydrocracking process for hydrocracking a hydrocarbon feed stream is addressed with reference to a process and apparatus 200. Elements of FIG. 2 may have the same configuration as in FIG. 1 and bear the same respective reference number and have similar operating conditions. Elements in FIG. 2 that correspond to elements in FIG. 1 but have a different configuration bear the same reference numeral as in FIG. 1 but are marked with a prime symbol (').

Referring to FIG. 2, the process and apparatus 200 comprise a hydroprocessing unit 101' and a fractionation section 105. The hydroprocessing unit 101' comprises the hydrotreating reactor 120 and a hydrocracking unit 103'. The hydrocracking unit 103' is a single-stage hydrocracking unit comprising hydrocracking reactor 130. The hydrocracking reactor 130 is similar to the first stage hydrocracking reactor 130 of the FIG. 1. As shown, the combined recycle stream in line 238 comprising the kerosene stream in line 234, the recycled portion of the diesel stream in line 236, and the UCO stream in line 226 is recycled to the hydrocracking reactor 130 of the single-stage hydrocracking unit 103'. In an embodiment, the combined recycle stream in line 238 may be combined with the hydrocarbon feed stream in line 102 and passed to the hydrocracking reactor 130 in line 106. In an exemplary embodiment, the combined recycle stream in line 238 may be combined with the mixed feed stream in line 104 to provide the feed stream for the hydrocracking reactor 130 in line 106. The feed stream in line 106 may be first passed to the hydrotreating reactor 120. The feed stream in line 106 may be heated by heat exchange with a hydrocracked effluent stream in line 134' and in a fired heater 110 to provide a heated hydrocarbon feed stream in line 112'. The heated hydrocarbon feed stream in line 112' may be fed to the hydrotreating reactor 120 to provide a hydrotreated hydrocarbon feed stream that exits the hydrotreating reactor 120 in line 122'. The hydrotreated hydrocarbon feed stream in line 122' may be mixed with a hydrocracking hydrogen stream in line 343 to provide a mixed hydrotreated hydrocarbon feed stream in line 124'. The mixed hydrotreated hydrocarbon feed stream in line 124' comprising the hydrotreated hydrocarbon feed stream in line 122' and the hydrogen stream in line 343 taken from the compressed hydrogen line 341 may be passed to the hydrocracking reactor 130.

In another exemplary embodiment, the combined recycle stream in line 238 may be passed to the hydrocracking reactor 130 along with the mixed hydrotreated hydrocarbon feed stream in line 124 (not shown). In such an embodiment, the mixed hydrotreated hydrocarbon feed stream in line 124 may be mixed with the combined recycle stream in line 238 to provide the feed stream (not shown) for the single-stage hydrocracking reactor 130.

Referring back to the hydrocracking reactor 130, the mixed hydrotreated hydrocarbon feed stream in line 124' may be passed to the hydrocracking reactor 130 for hydrocracking. In the hydrocracking reactor 130, the hydrotreated hydrocarbon feed stream in line 122' comprising a hydrotreated fresh feed stream and a hydrotreated combined recycle stream may be hydrocracked to provide the hydrocracked effluent stream in line 132'. The hydrocracked effluent stream in line 132' may be passed to the fractionation section 105 for separation. The rest of the process is the same as described for FIG. 1 herein above.

Any of the above lines, conduits, units, devices, vessels, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect. Further, the FIG. show one or more exemplary sensors such as 11, 21, 31, 41, and 51 located on one or more conduits. Nevertheless, there may be sensors present on every stream so that the corresponding parameter(s) can be controlled accordingly.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

Specific Embodiments

While the following is described in conjunction with specific embodiments, it will be understood that this description is intended to illustrate and not limit the scope of the preceding description and the appended claims.

A first embodiment of the present disclosure is a hydrocracking process comprising hydrocracking a hydrocarbon feed stream in a hydrocracking reactor in the presence of a hydrogen stream and a hydrocracking catalyst to produce a hydrocracked effluent stream; separating the hydrocracked effluent stream in a separator to provide a vapor hydrocracked stream and a liquid hydrocracked stream; fractionating the liquid hydrocracked stream to provide a naphtha stream, a kerosene stream having a T90 temperature of about 204° C. (399° F.) to about 238° C. (460° F.), a diesel stream having a T90 temperature of about 360° C. (680° F.) to about 383° C. (721° F.) and an unconverted oil stream; and recycling the kerosene stream, the unconverted oil stream, and a portion of the diesel stream to the hydrocracking reactor. The unconverted oil stream may have a T10 temperature of about 345° C. (653° F.) to about 395° C. (743° F.). An embodiment of the present disclosure is one, any or all of prior embodiments in this paragraph up through the first embodiment in this paragraph, wherein the separating step further comprises stripping a hot liquid hydrocracked stream to provide the liquid hydrocracked stream. An embodiment of the present disclosure is one, any or all of prior embodiments in this paragraph up through the first embodiment in this paragraph, wherein the hydrocracking reactor is a two stage hydrocracking reactor comprising a first stage hydrocracking reactor and a second stage hydrocracking reactor. An embodiment of the present disclosure is one, any or all of prior embodiments in this paragraph up through the first embodiment in this paragraph, wherein the kerosene stream, the unconverted oil stream and the portion of the diesel stream are recycled to the second hydrocracking reactor. An embodiment of the present disclosure is one, any or all of prior embodiments in this paragraph up through the first embodiment in this paragraph, wherein the kerosene stream recycled to the hydrocracking reactor ranges from about 5 to about 30 wt % of the feed. An embodiment of the present disclosure is one, any or all of prior embodiments in this paragraph up through the first embodiment in this paragraph further comprising splitting the diesel stream before passing the diesel stream to a dryer to provide the portion of the diesel stream for recycling, wherein the portion of the diesel stream recycled to the hydrocracking reactor ranges from about 5 wt % to about 30 wt % of the hydrocarbon feed. An embodiment of the present disclosure is one, any or all of prior embodiments in this paragraph up through the first embodiment in this paragraph further comprising passing a remaining portion of the diesel stream to the dryer to provide a diesel product stream in an amount from about 5 wt % to about 40 wt % of the hydrocarbon feed. An embodiment of the present disclosure is one, any or all of prior embodiments in this paragraph up through the first embodiment in this paragraph further comprising combining the kerosene stream, the portion of the diesel stream and the unconverted oil stream to provide a combined recycle stream and recycling the combined recycle stream to the hydrocracking reactor, wherein the combined recycle stream ranges from about 50 wt % to about 90 wt % of the hydrocarbon feed. An embodiment of the present disclosure is one, any or all of prior embodiments in this paragraph up through the first embodiment in this paragraph, wherein the hot liquid hydrocracked stream is provided from a hot separator. An embodiment of the present disclosure is one, any or all of prior embodiments in this paragraph up through the first embodiment in this paragraph further comprising passing the hydrocracked effluent stream to the hot separator to provide a hot separated vapor hydrocracked stream and a hot separated liquid hydrocracked stream; and separating the hot separated liquid hydrocracked stream to provide a hot vapor hydrocracked stream and the hot liquid hydrocracked stream. An embodiment of the present disclosure is one, any or all of prior embodiments in this paragraph up through the first embodiment in this paragraph further comprising passing the hot separated vapor hydrocracked stream to a cold separator to provide a cold separated vapor hydrocracked stream and a cold separated liquid hydrocracked stream; separating the cold separated liquid hydrocracked stream and the hot vapor hydrocracked stream to provide a cold vapor stream a cold liquid stream; stripping the cold liquid stream and the hot liquid hydrocracked stream to provide the liquid hydrocracked stream; and fractionating the liquid hydrocracked stream to provide the naphtha stream, the kerosene stream, the diesel stream and the unconverted oil stream. An embodiment of the present disclosure is one, any or all of prior embodiments in this paragraph up through the first embodiment in this paragraph, wherein the cold separated liquid hydrocracked stream and the hot vapor hydrocracked stream are separated in a cold flash drum to provide the cold liquid stream. An embodiment of the present disclosure is one, any or all of prior embodiments in this paragraph up through the first embodiment in this paragraph, wherein the hot separated liquid hydrocracked stream is separated in a hot flash drum to provide the hot liquid stream. An embodiment of the present disclosure is one, any or all of prior embodiments in this paragraph up through the first embodiment in this paragraph further comprising fractionating the liquid hydrocracked stream in a fractionation column to provide a first side draw stream comprising kerosene and a second side draw stream comprising diesel; and stripping the first side draw stream and the second side draw stream to provide the kerosene stream and the diesel stream. An embodiment of the present disclosure is one, any or all of prior embodiments in this paragraph up through the first embodiment in this paragraph further comprising hydrocracking the hydrocarbon feed stream in the first stage hydrocracking reactor to produce a first hydrocracked effluent stream; separating the first hydrocracked effluent stream and a second hydrocracked effluent stream together to provide the vapor hydrocracked stream and the liquid hydrocracked stream; and hydrocracking the kerosene stream, the unconverted oil stream, and the portion of the diesel stream in the second stage hydrocracking reactor in the presence of a second hydrogen stream and a second hydrocracking catalyst to produce the second hydrocracked effluent stream.

A second embodiment of the present disclosure is a hydrocracking process comprising hydrocracking a hydrocarbon feed stream in a first stage hydrocracking reactor operating at a first hydrocracking pressure in the presence of a first hydrogen stream and a first hydrocracking catalyst to produce a first hydrocracked effluent stream; separating the first hydrocracked effluent stream and a second hydrocracked effluent stream in a separator to provide a vapor hydrocracked stream and a liquid hydrocracked stream; and fractionating the liquid hydrocracked stream to provide a naphtha stream, a kerosene stream, a diesel stream, and an unconverted oil stream; and hydrocracking the kerosene stream, the unconverted oil stream, and a portion of the diesel stream in a second stage hydrocracking reactor operating at a second hydrocracking pressure in the presence of a second hydrogen stream and a second hydrocracking catalyst to produce the second hydrocracked effluent stream, wherein the portion of the diesel stream recycled to the hydrocracking reactor ranges from about 5 wt % to about 30 wt % of the hydrocarbon feed. An embodiment of the present disclosure is one, any or all of prior embodiments in this paragraph up through the second embodiment in this paragraph wherein the kerosene stream has a T90 temperature of about 204° C. (399° F.) to about 238° C. (460° F.), and the diesel stream has a T90 temperature of about 360°

C. (680° F.) to about 383° C. (721° F.). An embodiment of the present disclosure is one, any or all of prior embodiments in this paragraph up through the second embodiment in this paragraph further comprising splitting the diesel stream before passing the diesel stream to a dryer to provide the portion of the diesel stream for recycling to the second stage hydrocracking reactor; and passing a remaining portion of the diesel stream to the dryer to provide a diesel product stream in an amount from about 5 wt % to about 40 wt % of the hydrocarbon feed. An embodiment of the present disclosure is one, any or all of prior embodiments in this paragraph up through the second embodiment in this paragraph, wherein the kerosene stream recycled to the second stage hydrocracking reactor ranges from about 5 to about 30 wt % of the feed. An embodiment of the present disclosure is one, any or all of prior embodiments in this paragraph up through the second embodiment in this paragraph further comprising combining the kerosene stream, the portion of the diesel stream and the unconverted oil stream to provide a combined recycle stream and recycling the combined recycle stream to the second stage hydrocracking reactor, wherein the combined recycle stream ranges from about 50 wt % to about 90 wt % of the hydrocarbon feed.

A third embodiment of the present disclosure is a hydrocracking process comprising hydrocracking a hydrocarbon feed stream in a first stage hydrocracking reactor operating at a first hydrocracking pressure in the presence of a first hydrogen stream and a first hydrocracking catalyst to produce a first hydrocracked effluent stream; hydrocracking a recycle stream in a second stage hydrocracking reactor in the presence of a second hydrogen stream and a second hydrocracking catalyst to produce a second hydrocracked effluent stream; separating the first hydrocracked effluent stream and the second hydrocracked effluent stream in a separator to provide a vapor hydrocracked stream and a liquid hydrocracked stream; fractionating the liquid hydrocracked stream to provide a naphtha stream, a kerosene stream, a diesel stream, and an unconverted oil stream; combining the kerosene stream, the unconverted oil stream, and a portion of the diesel stream ranging from about 5 wt % to about 30 wt % of the hydrocarbon feed to provide the recycle stream, wherein the portion of the diesel stream is split before passing the diesel stream to a dryer to provide the portion of the diesel stream; and passing the recycle stream to the second stage hydrocracking reactor.

Without further elaboration, it is believed that using the preceding description that one skilled in the art can utilize the present disclosure to its fullest extent and easily ascertain the essential characteristics of this disclosure, without departing from the spirit and scope thereof, to make various changes and modifications of the present disclosure and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A hydrocracking process comprising:
hydrocracking a hydrocarbon feed stream in a hydrocracking reactor in the presence of a hydrogen stream and a hydrocracking catalyst to produce a hydrocracked effluent stream;
separating the hydrocracked effluent stream in a separator to provide a vapor hydrocracked stream and a liquid hydrocracked stream;
fractionating the liquid hydrocracked stream to provide a naphtha stream, a kerosene stream having a T90 temperature of about 204° C. (399° F.) to about 238° C. (460° F.), a diesel stream having a T90 temperature of about 360° C. (680° F.) to about 383° C. (721° F.) and an unconverted oil stream; and
recycling the kerosene stream, the unconverted oil stream, and a portion of the diesel stream to the hydrocracking reactor, wherein the portion of the diesel stream recycled to the hydrocracking reactor ranges from about 5 wt % to about 30 wt % of the hydrocarbon feed stream.

2. The process of claim 1, wherein the kerosene stream recycled to the hydrocracking reactor ranges from about 5 to about 30 wt % of the feed.

3. The process of claim 1 further comprising splitting the diesel stream into a first portion and a second portion before passing the diesel stream to a dryer to provide the portion of the diesel stream for recycling, wherein the portion of the diesel stream recycled to the hydrocracking reactor is the first portion which ranges from about 5 wt % to about 30 wt % of the hydrocarbon feed and the second portion is passed to the dryer.

4. The process of claim 3 further comprising passing the second portion of the diesel stream to the dryer to provide a diesel product stream in an amount from about 5 wt % to about 40 wt % of the hydrocarbon feed stream.

5. The process of claim 1 further comprising combining the kerosene stream, the portion of the diesel stream and the unconverted oil stream to provide a combined recycle stream and recycling the combined recycle stream to the hydrocracking reactor, wherein the combined recycle stream ranges from about 50 wt % to about 90 wt % of the hydrocarbon feed stream.

6. The process of claim 1 further comprising:
fractionating the liquid hydrocracked stream in a fractionation column to provide a first side draw stream comprising kerosene and a second side draw stream comprising diesel; and
stripping the first side draw stream and the second side draw stream to provide the kerosene stream and the diesel stream.

7. The process of claim 1, wherein the separating step further comprises:
stripping a hot liquid hydrocracked stream to provide said liquid hydrocracked stream.

8. The process of claim 7, wherein the hot liquid hydrocracked stream is provided from a hot separator.

9. The process of claim 8 further comprising:
passing the hydrocracked effluent stream to the hot separator to provide a hot separated vapor hydrocracked stream and a hot separated liquid hydrocracked stream; and
separating the hot separated liquid hydrocracked stream to provide a hot vapor hydrocracked stream and said hot liquid hydrocracked stream.

10. The process of claim 9 further comprising:
passing the hot separated vapor hydrocracked stream to a cold separator to provide a cold separated vapor hydrocracked stream and a cold separated liquid hydrocracked stream;
separating the cold separated liquid hydrocracked stream and the hot vapor hydrocracked stream to provide a cold vapor stream and a cold liquid stream;

stripping the cold liquid stream and the hot liquid hydrocracked stream to provide the liquid hydrocracked stream; and fractionating the liquid hydrocracked stream to provide the naphtha stream, the kerosene stream, the diesel stream and the unconverted oil stream.

11. The process of claim 10, wherein the cold separated liquid hydrocracked stream and the hot vapor hydrocracked stream are separated in a cold flash drum to provide the cold liquid stream.

12. The process of claim 9, wherein the hot separated liquid hydrocracked stream is separated in a hot flash drum to provide the hot liquid stream.

13. The process of claim 1, wherein the hydrocracking reactor is a two stage hydrocracking reactor comprising a first stage hydrocracking reactor and a second stage hydrocracking reactor.

14. The process of claim 13, wherein the kerosene stream, the unconverted oil stream and the portion of the diesel stream are recycled to the second hydrocracking reactor.

15. The process of claim 13 further comprising:

hydrocracking the hydrocarbon feed stream in the first stage hydrocracking reactor to produce a first hydrocracked effluent stream;

separating the first hydrocracked effluent stream and a second hydrocracked effluent stream together to provide the vapor hydrocracked stream and the liquid hydrocracked stream; and hydrocracking the kerosene stream, the unconverted oil stream, and the portion of the diesel stream in the second stage hydrocracking reactor in the presence of a second hydrogen stream and a second hydrocracking catalyst to produce the second hydrocracked effluent stream.

16. A hydrocracking process comprising:

hydrocracking a hydrocarbon feed stream in a first stage hydrocracking reactor operating at a first hydrocracking pressure in the presence of a first hydrogen stream and a first hydrocracking catalyst to produce a first hydrocracked effluent stream;

separating the first hydrocracked effluent stream and a second hydrocracked effluent stream in a separator to provide a vapor hydrocracked stream and a liquid hydrocracked stream;

fractionating the liquid hydrocracked stream to provide a naphtha stream, a kerosene stream, a diesel stream having a T90 temperature of about 360° C. (680° F.) to about 383° C. (721° F.), and an unconverted oil stream; and hydrocracking the kerosene stream, the unconverted oil stream, and a portion of the diesel stream in a second stage hydrocracking reactor operating at a second hydrocracking pressure in the presence of a second hydrogen stream and a second hydrocracking catalyst to produce the second hydrocracked effluent stream, wherein the portion of the diesel stream recycled to the hydrocracking reactor ranges from about 5 wt % to about 30 wt % of the hydrocarbon feed stream.

17. The process of claim 16 wherein the kerosene stream has a T90 temperature of about 204° C. (399° F.) to about 238° C. (460° F.), and the diesel stream has a T90 temperature of about 360° C. (680° F.) to about 383° C. (721° F.).

18. The process of claim 16 further comprising:

splitting the diesel stream before passing the diesel stream to a dryer to provide the portion of the diesel stream for recycling to the second stage hydrocracking reactor; and passing a remaining portion of the diesel stream to the dryer to provide a diesel product stream in an amount from about 5 wt % to about 40 wt % of the hydrocarbon feed stream.

19. The process of claim 16 further comprising combining the kerosene stream, the portion of the diesel stream and the unconverted oil stream to provide a combined recycle stream and recycling the combined recycle stream to the second stage hydrocracking reactor, wherein the combined recycle stream ranges from about 50 wt % to about 90 wt % of the hydrocarbon feed stream.

20. A hydrocracking process comprising:

hydrocracking a hydrocarbon feed stream in a first stage hydrocracking reactor operating at a first hydrocracking pressure in the presence of a first hydrogen stream and a first hydrocracking catalyst to produce a first hydrocracked effluent stream;

hydrocracking a recycle stream in a second stage hydrocracking reactor in the presence of a second hydrogen stream and a second hydrocracking catalyst to produce a second hydrocracked effluent stream;

separating the first hydrocracked effluent stream and the second hydrocracked effluent stream in a separator to provide a vapor hydrocracked stream and a liquid hydrocracked stream;

fractionating the liquid hydrocracked stream to provide a naphtha stream, a kerosene stream, a diesel stream having a T90 temperature of about 360° C. (680° F.) to about 383° C. (721° F.), and an unconverted oil stream;

combining the kerosene stream, the unconverted oil stream, and a portion of the diesel stream ranging from about 5 wt % to about 30 wt % of the hydrocarbon feed to provide the recycle stream, wherein the diesel stream is split into a first portion and a second portion before passing the diesel stream to a dryer to provide the portion of the diesel stream, wherein the portion of the diesel stream recycled to the hydrocracking reactor is the first portion and the second portion is passed to the dryer; and passing the recycle stream to the second stage hydrocracking reactor.

* * * * *